(No Model.)

J. D. FOSTER & V. C. HARRIS.
SPACE GRAIN DRILL AND COTTON PLANTER.

No. 270,048. Patented Jan. 2, 1883.

WITNESSES:
W. H. H. Knight
Harry Bernhard

INVENTORS
J. D. Foster
V. C. Harris
per Edson Bro's
Attorneys

UNITED STATES PATENT OFFICE.

JAMES D. FOSTER AND VIRGINIUS C. HARRIS, OF HUNTSVILLE, ALABAMA.

SPACE GRAIN-DRILL AND COTTON-PLANTER.

SPECIFICATION forming part of Letters Patent No. 270,048, dated January 2, 1883.

Application filed August 24, 1882. (No model.)

*To all whom it may concern:*

Be it known that we, JAMES DANIEL FOSTER and VIRGINIUS CLAXTON HARRIS, citizens of the United States, residing at Huntsville, in the county of Madison and State of Alabama, have invented certain new and useful Improvements in Space Grain-Drills and Cotton-Planters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to cotton and other seed planters, the object being to furnish means for elevating the seed from a hopper in proper quantities and spaces apart and deposit the same in the ground with regularity and precision; and to these ends our invention consists in mounting a hopper and a guiding-tube for the seed on a suitable frame, carrying a share in front for opening the furrow and a drag-bar for filling the same, an endless belt, with elevators, passing through the hopper, the latter being provided with brushes for stripping off the surplus seed, and means for tightening the endless belt, as hereinafter more fully described, and particularly pointed out in the claims.

Figure 1:
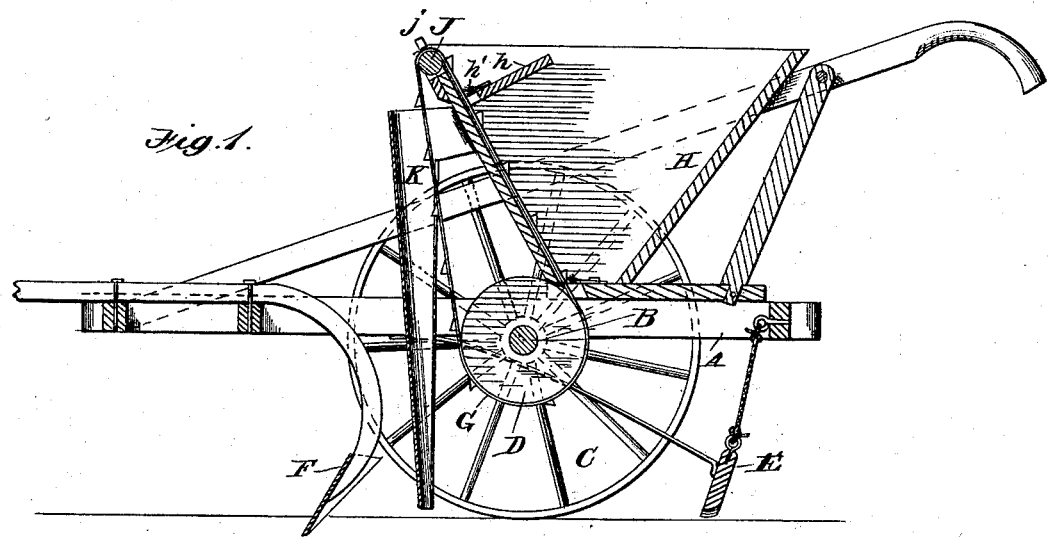
Figure 2:
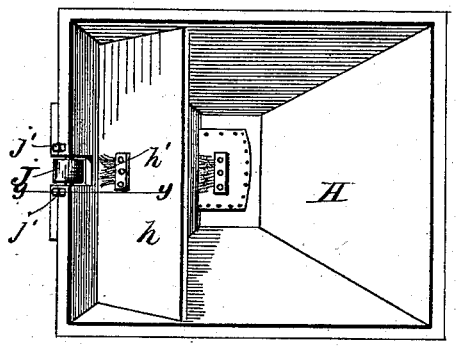
Figure 3:
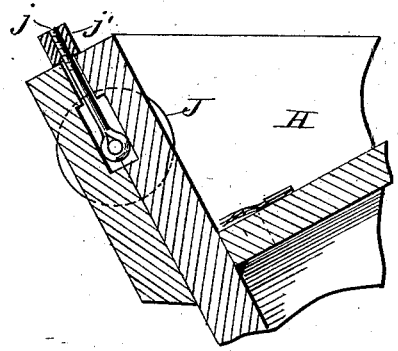
Figure 4:
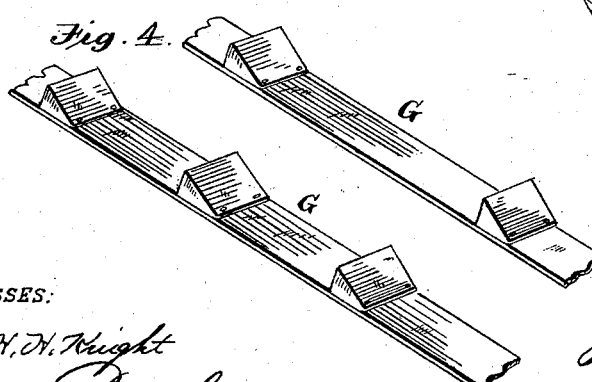

In the drawings, Figure 1 is a longitudinal vertical section of our improved seed-planter. Fig. 2 is a top plan view of the hopper. Fig. 3 is a detail of means for tightening the belt, and Fig. 4 shows the elevators spaced apart for planting different kinds of seed.

Like letters of reference denote like parts in each of the figures of the drawings.

In carrying out our invention we employ a frame, A, having suitable handles for guiding the machine, which is mounted upon an axle, B, supported by wheels C, and having a driving-pulley, D, which moves with the axle B.

E is a drag-bar for filling the furrow made by a suitable share, F, after the seed has been deposited therein. A series of elevators, of greater or less size, are attached to an inclined endless apron, G, and spaced apart, according to the kind of seed which for the time being is to be planted. For convenience, several belts can be provided, having the elevators of different sizes and spaced apart, in order to adapt each belt to plant a particular kind of seed. The endless belt passes in at the bottom of the hopper H and out over an adjustable friction-roller, J, carrying the seed upward over the hopper and dropping the same in the guiding and conically-shaped seed-tube K. The shape of this tube enables us to deposit the seed in the desired area of earth.

The hopper H is provided with a cross-piece, *h*, near its top, which has an opening guarded by a brush, *h'*, to prevent seed from being thrown out of the hopper other than that contained in the elevators, and to strip off the surplus seed in the elevators.

The friction-roller J is suspended in threaded hangers *j*, which can be adjusted by turning the nuts *j'*, whereby the endless belt can be kept taut.

Having thus described our invention, what we claim, and desire to secure by Letters Patent, is—

1. In a seed-planter, a seed-tube and endless belt having elevators spaced apart, as described, in combination with a hopper having near its top a perforated cross-piece and a perforated bottom, each of said perforations being covered with a brush, and an adjustable friction-roller, as and for the purposes set forth.

2. In a seed-planter, the conical tube K, endless belt G, having elevators, as described, in combination with a hopper, H, having perforated cross-piece *h* and brush *h'*, adjustable friction-roller J *j j'*, said belt being driven by a pulley, D, rigidly secured to the axle B of the carrying-wheels C, as and for the purpose set forth.

In testimony whereof we affix our signatures in presence of two witnesses.

JAMES DANIEL FOSTER.
VIRGINIUS CLAXTON HARRIS.

Witnesses:
THEODORE A. THURSTON.
E. A. CAIN.